(No Model.)
C. C. ANDREWS.
MANUFACTURE OF SHEET METAL KNOBS.
No. 376,502. Patented Jan. 17, 1888.
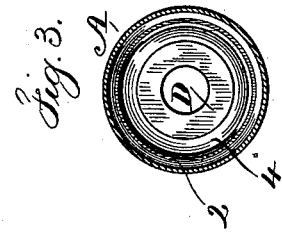
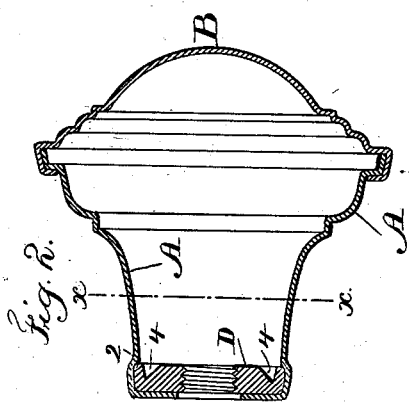
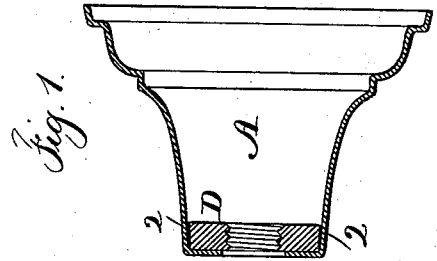
Witnesses
Chas. H. Smith
J. Staib
Inventor
Clayton C. Andrews.
per Lemuel W. Serrell
atty

United States Patent Office.

CLAYTON C. ANDREWS, OF WATERBURY, CONNECTICUT, ASSIGNOR TO THE AMERICAN RING COMPANY, OF SAME PLACE.

MANUFACTURE OF SHEET-METAL KNOBS.

SPECIFICATION forming part of Letters Patent No. 376,502, dated January 17, 1888.

Application filed August 22, 1887. Serial No. 247,523. (No model.)

*To all whom it may concern:*

Be it known that I, CLAYTON C. ANDREWS, of Waterbury, in the county of New Haven and State of Connecticut, have invented an Improvement in the Manufacture of Sheet-Metal Knobs, of which the following is a specification.

Knobs have been made of sheet metal with a nut within the knob at the base, such nut being confined by spinning or pressing the sheet metal inwardly to form an inclosing-flange, and the exterior of the knob is creased in an objectionable manner.

My present invention is made for firmly securing the nut within the sheet-metal knob, and at the same time lessening the cost of construction.

In the drawings, Figure 1 is a section of the nut and part of the shell before the nut is fastened in place. Fig. 2 is a section of the knob complete; and Fig. 3 is a section at the line $x$ $x$, Fig. 2.

The knob is made of two pieces, A and B, the outer or face portion, B, usually being of sheet metal, as well as the shell or back A, and the knob is of any desired size and shape, except that the back or inner part, 2, of the shell A is preferably cylindrical, to receive within it the cylindrical nut D, which should fit therein rather closely.

In order to secure the nut firmly in place I spread the edge outwardly and preferably all the way around; but the edge may be spread outwardly in sections. The edge of the nut is spread outwardly by a suitable tool having a sufficiently sharp edge to enter the top surface of the nut and form a groove or a series of depressions at 4, so that the outer edge is swaged or spread outwardly and embeds itself into the sheet metal sufficiently to hold the nut firmly within the shell A, and in so doing the thin sheet metal is slightly swelled and the two metals bind together firmly, so that the nut cannot get loose when the attaching-screw is passed into it.

I claim as my invention—

The method herein specified of manufacturing sheet-metal knobs, consisting in inserting into the sheet-metal shell A the nut D, fitting such shell, and then spreading the edges of the nut and thereby forcing the same against the sheet metal and spreading it by forcing into the metal of the nut a tool that spreads the metal outwardly, substantially as set forth.

Signed by me this 17th day of August, 1887.

CLAYTON C. ANDREWS.

Witnesses:
 DAVID N. PLUME,
 W. H. COOKE.